(12) United States Patent
Kreshchishin et al.

(10) Patent No.: US 9,120,552 B2
(45) Date of Patent: Sep. 1, 2015

(54) FUSELAGE AND METHOD FOR REDUCING DRAG

(76) Inventors: Gennady Trofimovich Kreshchishin, Moscow (RU); Larisa Trofimovna Kreshchishina, Moscow (RU)

( * ) Notice: Subject to any disclaimer, the term of this patent is extended or adjusted under 35 U.S.C. 154(b) by 345 days.

(21) Appl. No.: 13/605,920

(22) Filed: Sep. 6, 2012

(65) Prior Publication Data

US 2013/0062460 A1 Mar. 14, 2013

Related U.S. Application Data

(60) Provisional application No. 61/573,932, filed on Sep. 13, 2011.

(51) Int. Cl.
| | |
|---|---|
| *B64C 1/00* | (2006.01) |
| *B64C 1/26* | (2006.01) |
| *B64C 5/02* | (2006.01) |
| *B64D 27/14* | (2006.01) |
| *B64C 21/00* | (2006.01) |
| *B64C 1/14* | (2006.01) |

(52) U.S. Cl.
CPC .................. *B64C 1/0009* (2013.01); *B64C 1/26* (2013.01); *B64C 5/02* (2013.01); *B64C 21/00* (2013.01); *B64D 27/14* (2013.01); *B64C 1/14* (2013.01); *Y02T 50/12* (2013.01); *Y02T 50/166* (2013.01)

(58) Field of Classification Search
CPC    B64C 29/0025; B64C 29/062; B64C 29/066; B64C 2027/829; B64C 2027/8263; B64C 1/0009; B64C 5/02; B64C 15/02; B64C 21/00
USPC .......... 244/12.5, 12.6, 23 R, 23 D, 53 B, 130; D12/319, 345
See application file for complete search history.

(56) References Cited

U.S. PATENT DOCUMENTS 3,608,850 A * 9/1971 Fredericks ...................... 244/36

* cited by examiner

*Primary Examiner* — Nicholas McFall
(74) *Attorney, Agent, or Firm* — patenttm.us

(57) ABSTRACT

Aircraft engineering applicable for improving aerodynamic quality of helicopters, airplanes, including big airbuses and amphibian airplanes, aerodynamic ground-effect and air-cushion vehicles, by reducing contact area between the external fuselage tail section surface and a high-speed air flow, area of contact is reduced by increasing surface area of holes in the fuselage tail section. To increase lifting force without increasing pressure resistance, the aerodynamic channel bottom is convex upwards, for example, curved upwards according to the shape of the airfoil convex side. The upper hole for the aerodynamic channel in the fuselage skin may be located along the fin middle portion divided lengthwise by the fin to right and left, in two. The aerodynamic channel is made through and may be open. The upper front edge aligned hole of the aerodynamic channel has a greater surface area than the rear hole aligned with the fuselage end.

8 Claims, 3 Drawing Sheets

FUSELAGE AND METHOD FOR REDUCING DRAG

FIELD OF THE INVENTION

Figure 1:
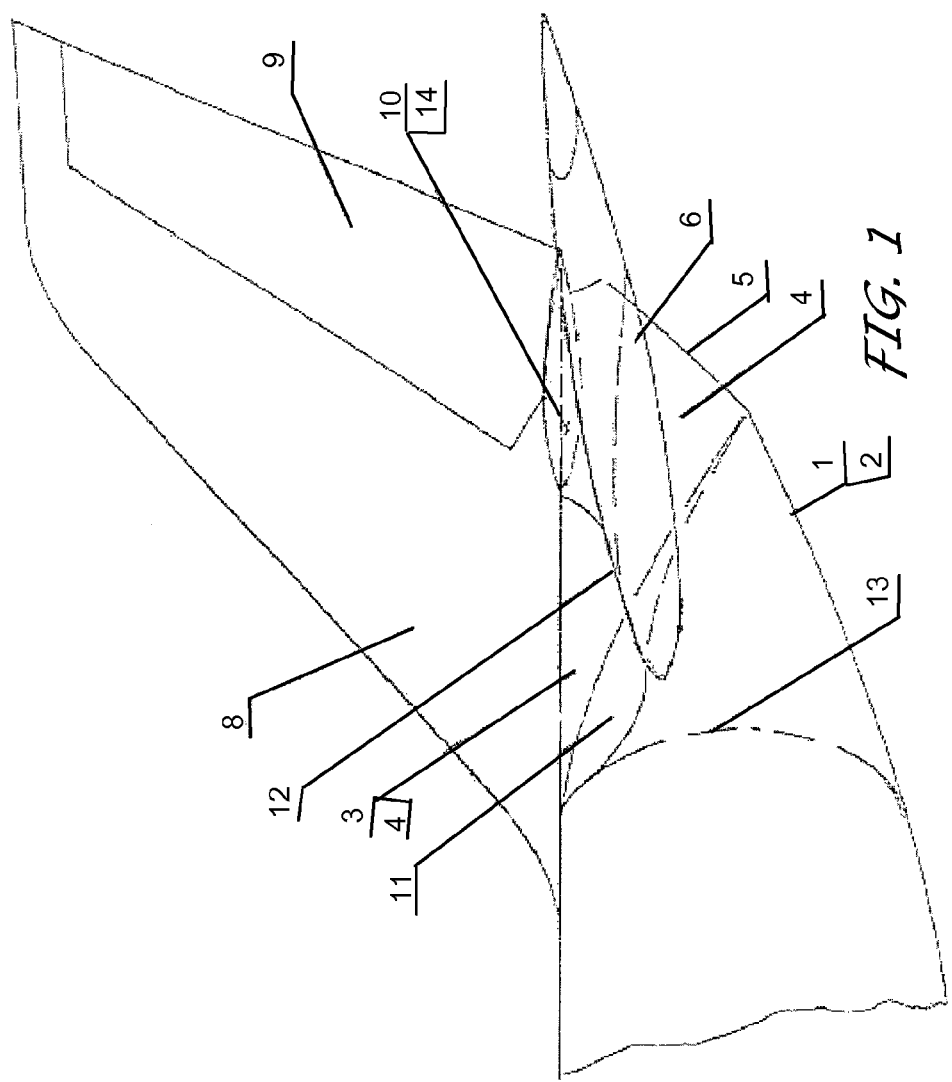

This invention relates to the field of aeronautical engineering and is applicable for improving the aerodynamic behavior of, and drag reduction for, helicopters, aircraft, including large airbuses of classical design and amphibian airplanes, rain wing surface-effect vehicles and air-cushion vehicles, possibly by redesigning them.

DESCRIPTION OF PRIOR ART

A Kreshchishin's airplane is known that comprises a through aerodynamic channel which is located on and inside the fuselage tail section (see: RF Patent Application No. 2002102457 B64C 1/26, 2002, for which RF Patent No. 2274584 was issued and published in 2006, inventors and patent holders are G. T. Kreshchishin and L. T. Kreshchishina).

A Kreshchishin's fuselage is known in the state of the art that comprises a tail section smoothly decreasing to its end, a fin with a flight direction rudder is secured over the tail section, and a through aerodynamic channel is arranged under the fin, which end is bent towards the fuselage end along the fuselage tail section (see: RF Patent Application No. 2007134266 B64C 5/02 dated Sep. 14, 2007 and the related International Application PCT/RU 2008/000592, and also US Patent Application No. 12676360 and EAPO Patent Application No. 201000309, for which EAPO Patent No. 014256 was issued and published on Oct. 29, 2010, inventors and patent holders are G. T. Kreshchishin and L. T. Kreshchishina).

Also, an airplane is known in the art that is provided with three aviation engines arranged in nacelles, two of them being secured on horizontal pylons to the narrowing part of the fuselage symmetrically to the longitudinal axis of the latter, and the third aviation engine is secured on a vertical pylon over the fuselage tail section, and a controllable rudder is arranged on a pivot axis over the third aviation engine. The nacelle air-inlet edges are orthogonal to the engine longitudinal axes. In order to prevent touching a runway, the fuselage longitudinal profile is made with the bottom significantly convex in the middle and the slightly curved fuselage top, and thus the fuselage profile resembles an upturned aerofoil with an aerodynamic force directed downward. In order to attain a smooth air flow in the fuselage boundary layer the fuselage tail-end is tapered so that its cross-section diameter smoothly decreases toward the fuselage end. The narrowing section of the fuselage is inconvenient for accommodating passengers or cargo and, as a rule, is not used commercially. Weighting of the fuselage tail section with the aviation engines causes a backward shift of the empty aircraft mass center, due to which it is necessary to arrange the wing and the undercarriage closer to the empennage. This increases the length of the forward fuselage exposed to great bending moments and complicates the airplane balancing, since during fueling or loading cargo the fuselage mass center moves forward. When the fuselage is loaded with cargo, the forward fuselage is loaded first, or passengers are board into the forward fuselage, and only after loading the forward fuselage the fuselage tail section is loaded which increases the aircraft loading time. The central aviation engine, which is secured to the vertical pylon in the fuselage end, is arranged high above the fuselage mass center and, depending on the tractive force of the central aviation engine, a variable-value negative pitching moment is created during flight, that is the aircraft head inclines downward when the central aviation engine tractive force is changed, which is to be inevitably considered during flight by controlling the elevation rudder or the controllable stabilizer, which, in its turn, requires additional attention from the pilots during flight and increase fuel consumption. (See: US Pat. No. 3,188,025, Class 244-55, 1963, p. 1, FIGS. 1, 2, and 3.)

SUMMARY OF THE INVENTION

The technical task is to reduce flying drag and improve aerodynamic quality, possibly an airplane, helicopter, rain wing surface-effect vehicle, air-cushion vehicle, air glider, amphibian airplane.

A technical effect can be achieved by decreasing the area of contact between the fuselage tail external surface and a high-velocity air flow, for which purpose the said area of contact is reduced by increasing the surface area of holes made in the fuselage tail end. In order to increase the lifting force without increasing the pressure drag, the bottom of the aerodynamic channel is made convex upwards, for example, convex upwards according to the form of the aerofoil convex side. The lateral surfaces of the aerodynamic channel may rest or may not rest on the tail section skin. A stabilizer with an elevation rudder may be attached to the robust frame of the tail section on the skin sides.

At least two turboprop aviation engines are secured on pylons in front of the aerodynamic channel, above and ahead of the areas used for securing the wing to the fuselage, and a stabilizing wing is attached between the lateral sides above the fuselage, aerofoils of the wing with geometric warp being selected at steady balancing for the purpose of improving flight stabilization and reducing drag, and different attack angles being taken for the two wings, the aerodynamic channel, the fuselage and the aviation engine attack angles and thrust being selected in allowable limits lesser than the beginning of stall of turbulent boundary layers of high-velocity air flow at the aerofoils, and the attack angles of the turboprop aviation engines being greater than that of the rear aviation engines.

The wing may be attached at the fuselage middle. Depending on supposed and selected balancing, the wing may be attached ahead of the fuselage middle. The two rear aviation engines may be attached on pylons behind the wing, on both sides of the fuselage upper portion. The width of the fuselage end is greater than its height in the highest point. The width of the fuselage end is greater than its height. The fuselage top may be separated along the fuselage at least in two by a long convex projection, possibly arranged above the passenger passage, for example along the fuselage middle.

The aerodynamic channel is made of two portions, namely the front open portion with the aviation engines secured before it and the rear tube-like portion bent along the fuselage top arranged above the cargo cabin, the said aerodynamic channel being made with surfaces of a single aerofoil. The tube-like portion of the aerodynamic channel may be arranged ahead, above and behind the wing. The tube-like portion of the aerodynamic channel is arranged behind the front aviation engines, in their high-velocity air flow; the top of the tube-like portion of the aerodynamic channel is made as a stabilizing wing curved upwards that creates, in the air flow of the front turboprop aviation engines, a constant lifting force depending on the operation mode of the front aviation engines, irrespective of the fuselage movement speed, including that during B takeoffs and landings, which depends on an attack angle of a high-velocity air flow, its strength and aerofoil. The lateral edges of the top are curved along the top, above the top middle portion connecting them transversely.

The top may be separated along the fuselage by a projection bent upwards at least in two, possibly arranged along the top middle.

At least one hole in the fuselage with the fin secured over it is made along the fin middle portion, e.g., along the middle portion of the fin support, and may be separated in two, to the right and to the left, along the fin support. At least a part of the fin support is secured in the fuselage tail-section end, possibly within which the tube-like portion of the aerodynamic channel is arranged.

The bottom of the fuselage tail section may be made, at least with one aperture. This at least one aperture may be closed by a gate with opening and closing leaves suspended on the aperture borders. The gate leaves are made removable and may be dismounted. The edges of the aerodynamic channel tail may be aligned and connected to the aperture borders in the fuselage tail. The gate leaves may be provided with rotation mechanisms. The fuselage is provided with elevators for loading and unloading cargo, e.g., for servicing handicapped passengers, cargo and for servicing dry closets, in the points of apertures. The edge of the end of the fuselage tail section is made with apertures and in the form of apertures.

In order to reduce flying drag for the selected wing and fuselage aerofoils, their attack angles are changed and selected within the limits that are lesser than those at which a high-velocity air flow stalls. It is possible to reduce flying resistance, if a portion of a whirling air flow is drawn from the upper surface of the fuselage tail section into the aerodynamic channel inlet under the action of negative air pressure behind the fuselage tail section, stabilized, formed in a jet, and goes as an ordered jet into the space behind the fuselage tail section where whirling air flows exist.

The method for reducing drag consists in that at least one hole with the edges round off inside the fuselage is made in the skin upper part, and the other hole should be in the form of a cut in the tail section end, and these two holes are connected by the aerodynamic channel.

If the technical task of reducing flying drag of the fuselage is solved according to the invention in any time sequence, the fuselage may be used in an air glider, aerodynamic ground-effect and air-cushion vehicle, helicopter, airplane, including an amphibian airplane.

BRIEF DESCRIPTION OF THE DRAWING FIGURES

Figure 2:
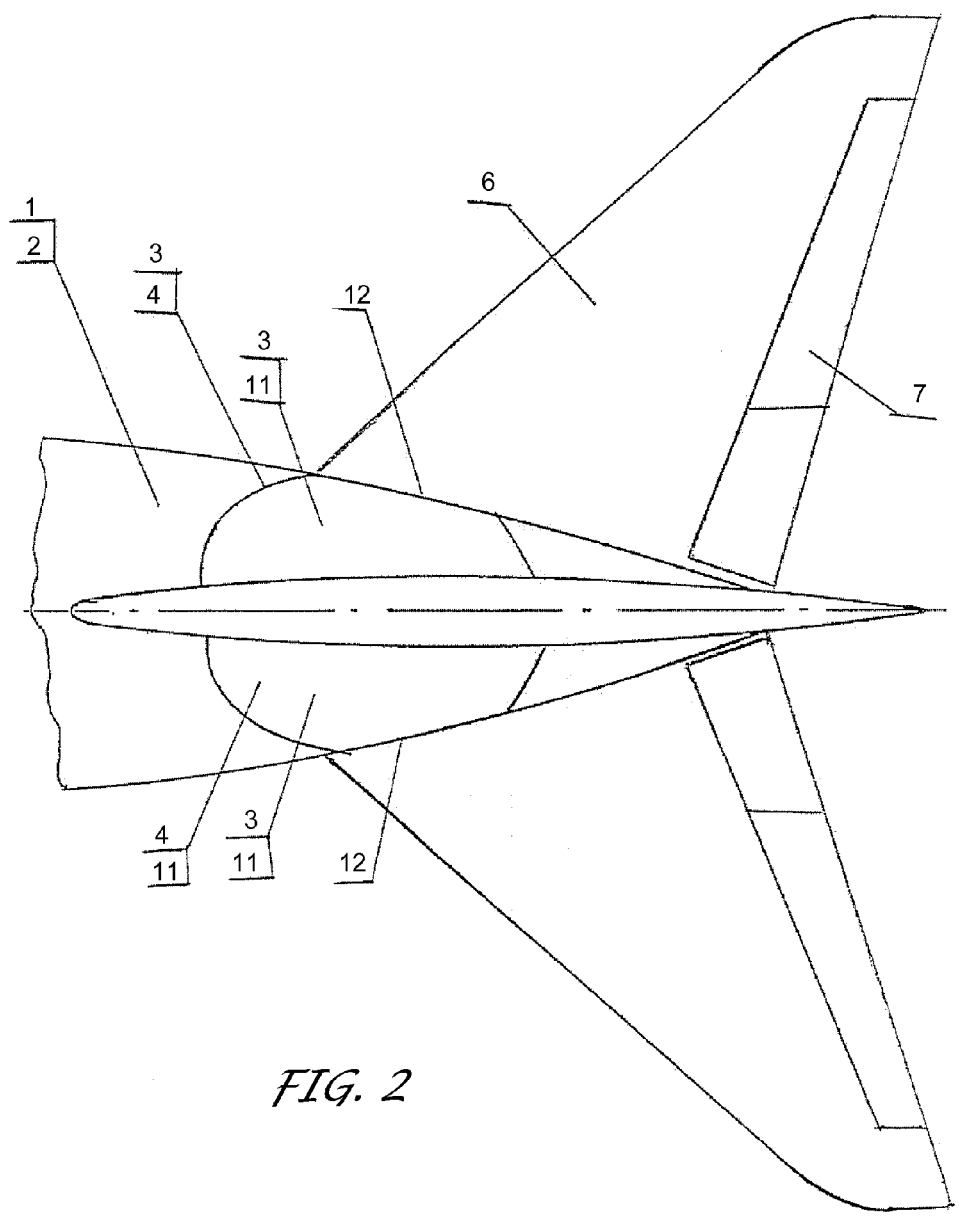
Figure 3:
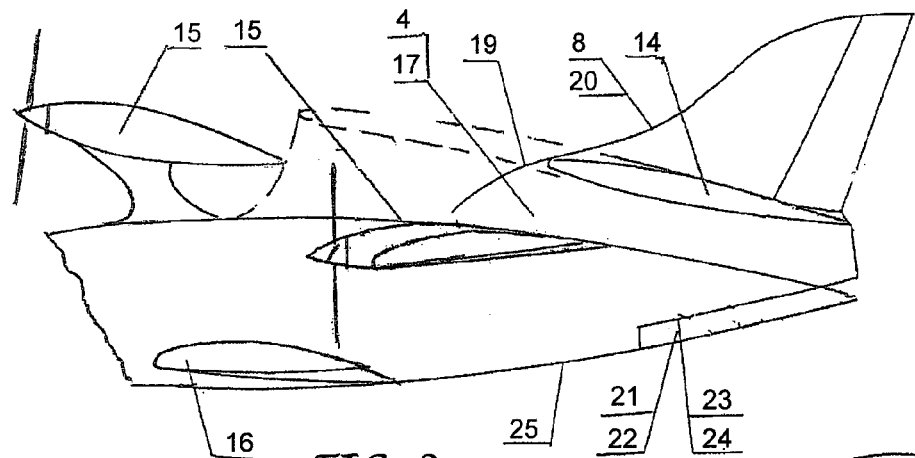
Figure 4:
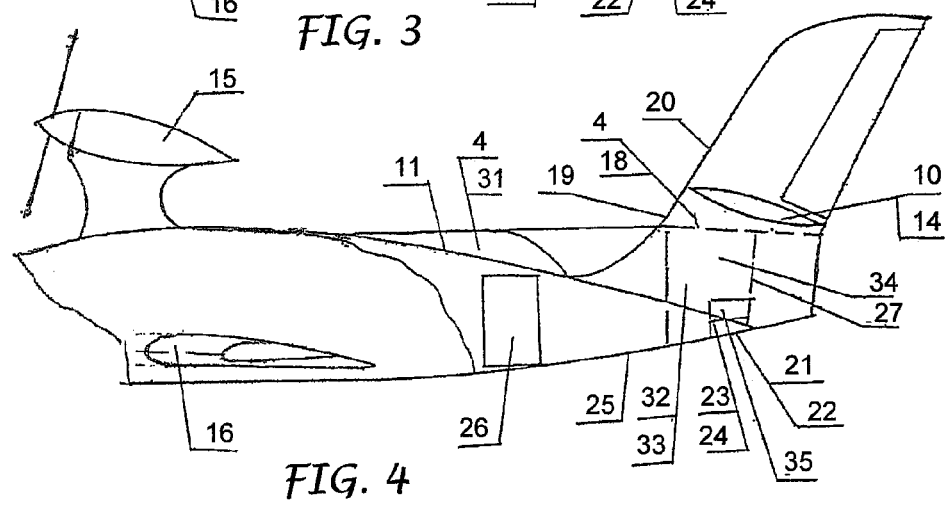
Figure 5:
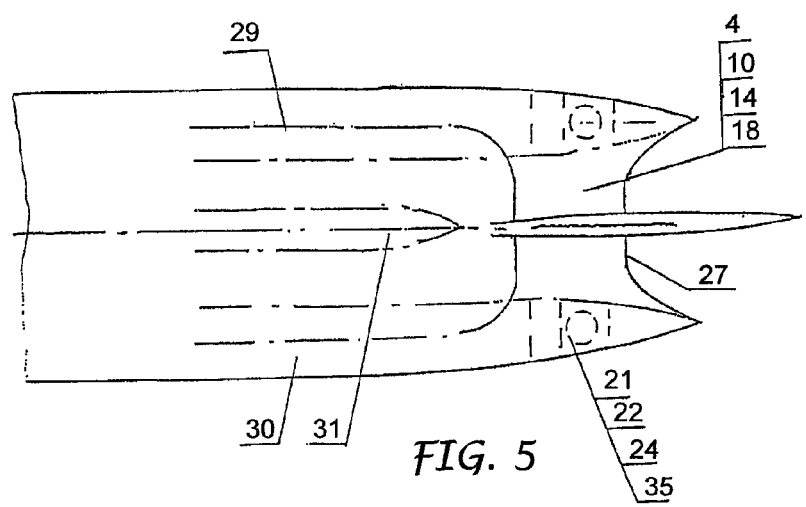

FIG. 1 shows the fuselage tail section, a lateral view.
FIG. 2 shows the fuselage tail section, a top view.
FIGS. 3 and 4 show the fuselage tail section, illustrating possible variants of making and arranging the bottom gate and the smoothly bent aerodynamic channels, cross-sectional lateral views with dimensions.
FIG. 5 shows the fuselage tail section of FIGS. 3 and 4 having the wide tail section and the wide bottom aperture, which are created by the wide aerodynamic channel aligned with the curved top of the passenger cabin and connected to the borders of the aperture and the hole in the fuselage tail, and having two apertures on the sides of the tail section, which are closed by leaves of the bottom gate intended for mounting and dismounting dry closets.

DESCRIPTION OF THE PREFERRED EMBODIMENT

Holes and an inclined aerodynamic channel are made in the fuselage tail section 1. The aerodynamic form of the tail section 1 is created by the skin 2 attached to a robust frame; a hole 3 is made in the upper part of the skin, which is aligned by round-offs with the front upper edge of the inclined aerodynamic channel 4 which lower edge is aligned with a hole 5 made as a cut in the end of the tail section 1. A stabilizer 6 with an elevation rudder 7 is attached to the robust frame to the sides of the skin 2, and a fin 8 with a rudder 9 is attached to the robust frame on the top of the skin 2. The upper portion 10 of the tail section 1 may be made as a wing, possibly with an symmetrical aerofoil and in other embodiments with an unsymmetrical aerofoil, including upturned one, with downward curvature also called aerofoil negative curvature. The bottom 11 of the aerodynamic channel 4 may be made bent upwards lengthwise on its lateral sides and, possibly, at the same time curved according to the form of the aerofoil convex side. The hole 3 in the skin 2 is bent according to the form of the skin 2 and may be made oval, separated lengthwise to the right and to the left, for example, in two by the fin 8, and the bend and the width of the hole 3 may be limited by the upper surface 12 of the stabilizer 6, and the length of the hole 3 may be limited by the distance from the sealing partition 13 of the passenger cabin to the stabilizing wing 14. The hole 3 may have a greater surface area than the hole 5 with a cut in the end of the tail section 1.

In this embodiment, as shown in FIGS. 3 and 4, the two lateral turboprop aviation engines 15 are secured on the fuselage, e.g., on pylons, before the wing 16 symmetrically to the fuselage longitudinal axis above the said axis. One of possible embodiments of making and arranging the aerodynamic channel, which are applicable for redesigning existing airplanes, is secured on the fuselage tail section, namely, smoothly bent and steeply inclined channel 17 shown in FIG. 3, or another smoothly bent aerodynamic channel 18 shown in FIG. 4 and intended for a short fin. The tube-like portion of the aerodynamic channels 17 and 18 is curvilinearly bent downwards along the cargo hold top, and its edge 19 smoothly mates the front edge 20 of the fin 8. The leaves 21 of the bottom gate 22 may be provided with rotation mechanisms, may be closed and, possibly, open, removed from the borders 23 of the aperture 24 in the fuselage bottom 25 and installed on the aperture 24 of the fuselage bottom 25. The boarding ramp—door 26 is made on the lateral side of the fuselage tail section. The fuselage tail section 1 ends on its line of mating the aerodynamic channel 4 by a cut end of the tail section 1 along the edge of the wide open aperture 27.

The aerodynamic channel 4, which is shown in FIGS. 4 and 5, is made wide and comprises the following parts: the bottom 11 of the front wide portion of the aerodynamic channel 4 is aligned with the curved top of the cargo hold with raised edges 29 and 30 and the cargo hold middle 31 curved upwards along the longitudinal axis of the cargo hold; the tube-like portion 32 is smoothly bent along the rear section 33 and the bottom 11 of the aerodynamic channel 4 as a through air conduit 34, which upper portion 10 in the fuselage tail section 1 may be made as the wing 14, possibly with a biconvex aerofoil within the limits of attack angles lesser than the beginning of stall of a high-velocity air flow thereon. The bottom gate 22 are provided with elevators 35.

The surface of the bottom 11 of the aerodynamic channel 4, which is smoothly bent according to the aerofoil form and, possibly, is curved upwards on the lateral sides, contributes to a reduction in the total air flow resistance in the aerodynamic channel 4 and to an increase of the lifting force in the aerodynamic channel.

An airplane of classical form may have the external skin friction drag in the range from 70% to 80% of the total airplane drag, and a share of the pressure drag is in the range from 15% to 26% of the total airplane drag, that is a significantly less part of the total airplane drag, which, however, creates the whole 100% of the airplane wing lifting force and overcomes the profile drag of the airplane forward and tail sections. Since the profile of the tail section 1 of an airplane of classical form has a negative curvature, the air pressure under the bottom of the tail section 1 and the hole 3 is less than the air pressure over the top of the tail section 1 and the hole 3, and this pressure difference pushes the airplane tail section down during the flight. Therefore, the greater are the holes 3 and 5, the less are a pressure drag and a lifting force loss of an airplane due to the fact that the airplane tail section 1 is bent upwards. As a result, the proposed fuselage will ensure a reduction in the airplane total drag and the corresponding reduction in the required aviation engine thrust.

A turbulent air flow over the tail section 1 is drawn into the aerodynamic channel 4, stabilized, formed into a jet and goes as an ordered jet into whirling air flows behind the fuselage tail. Air low pressure and additional lifting force are created over the wing 14, and an air flow from the aerodynamic channel 4 erodes and reduces whirling air flows behind the hole 5 in the tail section 1, thus reducing air resistance to the flying airplane.

The aerodynamic channels 17 and 18 with the front edge 19 inclined toward the fuselage tail and smoothly mated with the front edge 20 of the fin 8 add an air flow into the aerodynamic surfaces of the aerodynamic channel 4 and may be used for increasing the lifting force of the aerodynamic channel 4 arranged on the external surface of the curved fuselage top.

The rotation mechanisms and elevators 35 of the gate 22 are intended for servicing handicapped passengers, loading and unloading cargo and, possibly, for servicing dry closets. The projections 29, 30 and 31 along the lateral edges of the top and the aerodynamic channel 4 increase the strength of the aerodynamic channel 4 and, at the same time, increase the fuselage cabin ceiling height in the longitudinal passages through the tail section 1 to the boarding ramp—door 26 and dry closets.

In order to stabilize the fuselage attack angle during flight, the wing 14 with an aerofoil on the upper portion 10 of the end of the tail section 1 is arranged within the attack angle limits lesser than those at which a high-velocity flow begins to stall on the wing 16 and the fuselage and at which an aerodynamic force emerging on the wings prevents the tail section 1 from fluctuating and stabilizes the fuselage attack angle.

What is claimed is:

1. A method for reducing flying drag and improving aerodynamic behavior of a fuselage, comprising:
   providing a width of the fuselage to be greater than a maximum height of the fuselage,
   providing an aerodynamic channel bent upwards in a middle portion thereof and comprising of two parts a front open portion and a rear tube portion bent along a top of the fuselage arranged over a cargo hold cabin,
   providing the aerodynamic channel with profile creating lifting force,
   providing a top of the tube portion in the form of a stabilizing wing in a shape creating lifting force,
   providing at least two aviation engines on pylons above and ahead of areas used for securing a wing to the fuselage and in front of the aerodynamic channel,
   and, accelerating aerodynamic flow in the aerodynamic channel and increasing lifting force depending on an operation mode of the aviation engines and independent of fuselage speed.

2. The method of claim 1, wherein it is applied, in any time sequence, for an air glider, or an aerodynamic ground-effect and air-cushion vehicle, or a helicopter, or an airplane, or an amphibian airplane.

3. The method of claim 1, further comprising:
   selecting different attack angles of the fuselage and the stabilizing wing.

4. The method of claim 1, further comprising:
   providing turboprop aviation engines ahead of the aviation engines at a front part of the stabilizing wing.

5. The method of claim 1, further comprising:
   providing turboprop aviation engines on pylons ahead of the aviation engines in a front part of the fuselage and the stabilizing wing.

6. The method of claim 1, further comprising:
   providing a wing ahead a middle portion of the fuselage, and
   providing the tube portion of the aerodynamic channel arranged ahead, above and behind the wing.

7. The method of claim 6, wherein the wing is made with geometrical twist.

8. The method of claim 1, wherein a bottom of the fuselage comprises at least one aperture covered by a gate with closing and opening leaves, the leaves are provided with rotation mechanisms, and the least one aperture is provided with elevators.

* * * * *